(12) United States Patent
Kiekhaefer (10) Patent No.: US 6,296,188 B1
(45) Date of Patent: *Oct. 2, 2001

(54) TRANSPARENT/TRANSLUCENT FINANCIAL TRANSACTION CARD INCLUDING AN INFRARED LIGHT FILTER

(75) Inventor: John H. Kiekhaefer, Bloomingdale, IL (US)

(73) Assignee: Perfect Plastic Printing Corporation, St. Charles, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/449,251

(22) Filed: Nov. 24, 1999

Related U.S. Application Data (63) Continuation-in-part of application No. 09/411,359, filed on Oct. 1, 1999.

(51) Int. Cl.[7] .................................................. G06K 19/00
(52) U.S. Cl. .............................................. 235/487; 902/25
(58) Field of Search ................................... 235/487, 488, 235/491, 468, 490, 494; 902/25, 29

(56) References Cited

U.S. PATENT DOCUMENTS

| | | |
|---|---|---|
| D. 406,861 | 3/1999 | Leedy, Jr. ...................... D19/10 |
| 3,536,894 * | 10/1970 | Travioli ........................ 235/468 X |
| 3,763,356 * | 10/1973 | Berler ................................ 235/468 |
| 3,836,754 * | 9/1974 | Toye et al. ........................ 235/488 |
| 3,919,447 | 11/1975 | Kilmer, Jr. et al. ............... 428/138 |
| 3,987,725 * | 10/1976 | Scantlin .......................... 902/29 X |
| 4,436,991 * | 3/1984 | Albert et al. ..................... 235/468 |
| 4,544,836 * | 10/1985 | Galvin et al. ..................... 234/487 |
| 4,694,148 | 9/1987 | Diekemper et al. ............... 235/468 |
| 4,837,134 | 6/1989 | Bouldin et al. ................... 430/445 |
| 4,950,877 * | 8/1990 | Kurihara et al. .................. 235/480 |
| 5,005,873 * | 4/1991 | West ............................. 235/491 X |
| 5,241,165 * | 8/1993 | Drexler ............................ 235/488 |
| 5,300,764 | 4/1994 | Hoshino et al. .................. 235/487 |
| 5,410,142 * | 4/1995 | Tsuboi et al. .................... 235/488 |
| 5,434,404 * | 7/1995 | Liu et al. ......................... 235/475 |
| 5,518,810 | 5/1996 | Nishihara ......................... 428/328 |
| 5,700,037 | 12/1997 | Keller .............................. 283/107 |
| 5,856,661 * | 1/1999 | Finkelstein et al. .............. 235/487 |
| 6,019,284 * | 2/2000 | Freeman et al. .................. 235/380 |
| 6,074,726 | 6/2000 | Vezinet et al. ................... 428/195 |

FOREIGN PATENT DOCUMENTS

| | | |
|---|---|---|
| 2 106 832 * | 4/1983 | (GB) . |
| 2 229 189 * | 9/1990 | (GB) . |
| 11-20356 * | 1/1999 | (JP) . |
| 11-53496 * | 2/1999 | (JP) . |

OTHER PUBLICATIONS

Specimen of credit card offered for sale at least as early as Feb., 1974.

* cited by examiner

Primary Examiner—Michael G. Lee
Assistant Examiner—Jared J. Fureman
(74) Attorney, Agent, or Firm—Walter W. Duft; Joseph P. Gastel (57) ABSTRACT

A financial transaction card is transparent or translucent to human viewing yet detectable by automated card processing equipment. The card includes a substantially planar material sheet having upper and lower surfaces bounded by a continuous peripheral edge. The material sheet has one or more areas that are at least minimally transparent or translucent with respect to human-visible light. A filter associated with at least one of the areas provides sufficient opacity to light that is detectable by sensors in the automated card processing equipment to render the card detectable by the equipment.

49 Claims, 6 Drawing Sheets

TRANSPARENT/TRANSLUCENT FINANCIAL TRANSACTION CARD INCLUDING AN INFRARED LIGHT FILTER

CROSS-REFERENCE TO RELATED APPLICATIONS

This application is a continuation-in-part of application Ser. No. 09/411,359, filed Oct. 1, 1999, entitled "Transparent/Translucent Financial Transaction Card".

STATEMENT REGARDING FEDERALLY SPONSORED RESEARCH OR DEVELOPMENT

Not Applicable

BACKGROUND OF THE INVENTION

1. Field of the Invention

This invention relates generally to financial transaction cards, including credit cards, debit cards, ATM (Automated Teller Machine) cards, and the like. More particularly, the invention relates to a financial transaction card which is transparent or translucent to human viewing yet can be detected by sensing devices in automated card processing equipment, such as embossing/encoding machines employed during card manufacturing, ATMs employed during card use, and other devices.

2. Description of the Prior Art

For some time, financial institutions have been interested in offering financial transaction cards having areas that are transparent or translucent to human viewing. Prior art efforts to achieve such design effects have produced the following examples:

- Cards incorporating transparent or translucent films.
- Cards incorporating transparent or translucent magnifying lenses.
- Cards incorporating transparent or translucent holograms,
- Cards incorporating transparent or translucent lenticular patterns.
- Cards incorporating other transparent or translucent optical effects.
- Cards that are partially transparent or translucent, but also have a high level of opacity provided by the presence of coating(s) containing fillers or pigmentation.

The perceived advantage of a transparent or translucent financial transaction card is that the card will be relatively unique in the marketplace and impart status to the card user as compared to other users who have only opaque cards. A bank or other entity offering a transparent or translucent card can potentially attract users who will preferentially select such a card over competitive opaque cards, and thereby provide income to the institution as a result of card usage.

A significant problem with transparent or translucent cards is that the cards also need to function properly when processed during manufacture in card embossing/encoding equipment, when deployed by users in ATMs, or when used in other automated card processing equipment. These machines utilize light transmission-based sensing devices that are not able to detect the presence of transparent or translucent cards. This is due to the fact that the sensing devices are not able to see the cards as opaque (light blocking). The light emitted from the light sources associated with such sensing devices passes through the cards rather than being blocked from reaching the sensing devices. To the best of applicant's knowledge, none of the transparent or translucent cards produced to date can be processed through embossing/encoding equipment, deployed in ATMs, or used in other automated card processing equipment.

Accordingly, there is a need for a transparent or translucent financial transaction card that overcomes the forgoing problem. What is required is financial transaction card that is transparent or translucent to human viewing in one or more areas of the card, yet which is detectable by automated card processing equipment, of any type.

BRIEF SUMMARY OF THE INVENTION

A solution to the foregoing problem and an advance in the art is provided by the present invention in which a financial transaction card has one or more areas that are at least minimally transparent or translucent to human viewing, yet the card is detectable by sensing devices in automated card processing equipment.

In a preferred embodiment of the invention, the card includes a substantially planar material sheet having upper and lower surfaces bounded by a continuous peripheral edge. The material sheet is formed to include the aforementioned one or more areas that are at least minimally transparent or translucent relative to human-visible light. A filter is associated with at least one of these areas and provides sufficient opacity to light detectable by the sensors in automated card processing equipment to render the card detectable by such equipment.

The automated card processing equipment may include ATMs having sensor/detector pairs operating in a light wavelength range of about 750–1200 nm. In that case, the filter should provide opacity relative to such wavelengths of not substantially less than the opacity required by such equipment. The automated card processing equipment may also include a card embossing/encoding machine having sensor/detector pairs operating in a light wavelength range of about 830–1100 nm. In that case, the filter should provide opacity relative to such wavelengths of not substantially less than the opacity required by such equipment. If the card is to be compatible with both ATMs and card embossing/encoding machines, the filter should comply with the worst-case ATM opacity and wavelength range requirements.

The filter referred to herein includes any suitable medium or device that can provide the opacity required for automated card detection. By way of example, the filter can be made from a variety of light filtering materials, including materials that are light absorbing, light reflecting, light deflecting, light scattering or the like, relative to the applicable wavelength range. The filter can also be made from various combinations of such materials. Light absorbing materials that can be used for the filter include colorless light absorbers, light absorbing dyes, and other materials. Light reflecting materials that can be used for the filter include silver compositions, silver-titanium oxide compositions, and other materials. Light deflecting materials that can be used for the filter include light deflecting films. Light scattering materials that can be used for the filter include light scattering coatings. To the extent that the filter materials cause card discoloration, a suitable colorant can be introduced to produce an aesthetically pleasing card color or tint.

In specific filter constructions, a light filtering material can be incorporated in a liquid coating and applied to the material sheet using screen printing or other application methods. Relatedly, the light filtering material can be similarly applied to a solid film that is then secured to the material sheet using lamination techniques, adhesive bonding, or other application methods. In alternative filter constructions, a light filtering material can be incorporated into the material sheet prior to or during extrusion or calendaring thereof (while it is a soft resin), or can be sublimated therein by heat diffusion processing, such that the light filtering material is disbursed through all or a portion of the material sheet. Relatedly, the light filtering material can be similarly introduced into a solid film that is then secured to the material sheet. In alternative filter constructions, a light filtering material can be deposited on the material sheet using a suitable deposition technique. Relatedly, the light filtering material can be similarly deposited on a solid film that is then secured to the material sheet. Still other filter constructions will no doubt be apparent to persons skilled in the art in view of the teachings herein.

In preferred embodiments of the invention, the light filtering material is a near infrared light absorbing material, such as a light absorbing dye, and the liquid coating is an appropriate solvent-based material, such as an organic solvent-based liquid vinyl resin. If desired a colorant can be added to adjust the visible coloration of the resultant card. Suitable colorants include dye colorants, light scattering materials, and fluorescent materials. Advantageously, the light scattering materials also provide a mechanism for reducing near infrared light transmittance, as mentioned above. The light fluorescent materials also assist in card detection when used with a near infrared absorber or other filtering material. If desired, an Ultra Violet (UV) light absorbing material can be added to prevent degradation of the light filtering material.

BRIEF DESCRIPTION OF THE SEVERAL VIEWS OF THE DRAWING

The foregoing and other features and advantages of the invention will be apparent from the following more particular description of a preferred embodiment of the invention, as illustrated in the accompanying Drawing, in which.

DETAILED DESCRIPTION OF THE INVENTION

I. GENERAL CONSIDERATIONS

For purposes of the present description, a transparent medium will be understood to be a material that transmits human-visible light without substantial scattering. A transparent medium allows a person to view definable images through it. A translucent medium will be understood to be a material that transmits human-visible light but with substantial light scattering. A person will be able to see light through a translucent medium but will not see defined images. An opaque medium will be understood as blocking a substantial portion of incident light within a particular wavelength range via absorption, reflection or otherwise. If a medium is opaque to human viewing, a person will not be able to detect any light being transmitting from one side to the other. If a medium is non-opaque to human viewing, it will be at least minimally transparent or translucent and a person will be able to see at least some light being transmitted from one side to the other.

Table 1 below illustrates the correlation between density (opacity) and transmittance as these concepts will be applied in describing the preferred embodiment of the invention. Table 1 is based on conversion calculations of density (opacity) to transmittance using the conversion formula Density=Log (1/Transmittance).

TABLE I

Correlation for Card Density(Opacity) and Transmittance

| Density (Opacity) | Approximate Light Transmittance | Density (Opacity) | Approximate Light Transrnittance |
|---|---|---|---|
| 0.10 | 79% | 0.80 | 16% |
| 0.20 | 63% | 0.90 | 13% |
| 0.30 | 50% | 1.00 | 10% |
| 0.40* | 40%* | 1.30 | 5% |
| 0.42 | 38% | 1.50 | 3% |
| 0.50 | 32% | 2.00 | 1% |
| 0.52 | 30% | 3.00 | 0.1% |
| 0.60 | 25% | 4.00 | 0.01% |
| 0.70 | 20% | | |

*Possible human perception limit of opacity in average visible light conditions

Figure 1:
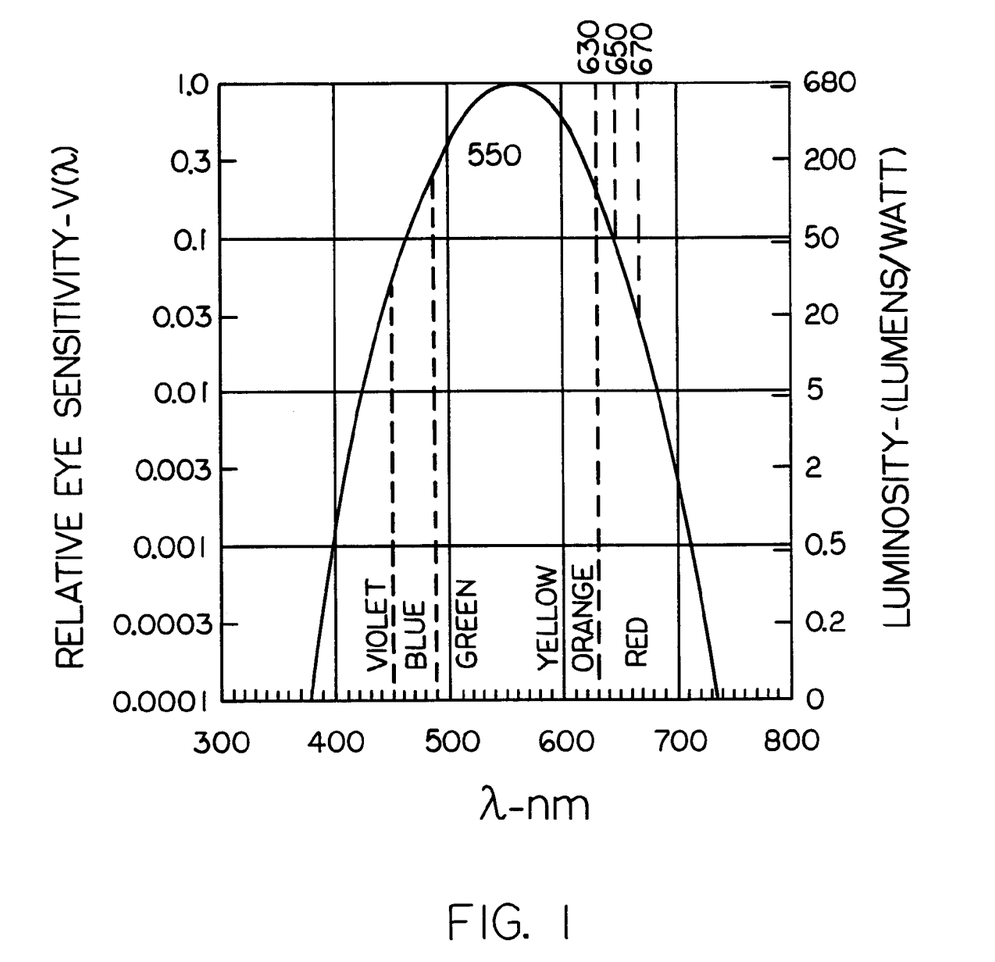
FIG. 1 is a graph showing human eye sensitivity and luminosity as a function of light wavelength.

The primary requirement of a financial transaction card in accordance with the invention is that it must have an area that transmits light in the visible light range of the electromagnetic spectrum (380–750 nm) with sufficient transmittance to be perceived as being at least minimally transparent or translucent by a human viewer. FIG. 1 illustrates relative light sensitivity of the human eye as a function of wavelength. As shown therein, greatest human light sensitivity is at 550 nm. Based on visual correlation between measured card samples and human viewing of those samples under average viewing conditions (e.g., room light), and based on Table 1 above, it has been determined by applicant that a financial transaction card should preferably transmit at least about 40% of incoming visible light (380–750 nm) for it to appear to be noticeably different from a standard opaque card to card users. However, because lower (e.g., 15–20%) or higher (e.g., 70–80%) transmittance levels may be desired, depending on customer preferences, the 40% level should not be construed as limiting relative to the invention.

II. ATM CONSIDERATIONS

The devices for sensing the presence of financial transaction cards in ATMs generally consist of a light source and a detector (having a sensor) paired together to identify the presence of a card if the light source is blocked from the detector. The absence of a card is identified if there is light transmission to the detector. Typically, multiple source/detector pairs are employed. At least one pair is located at or near the card insertion slot and additional pairs are usually spaced over the entire surface of the card. In order for a financial transaction card to be detected in an ATM, it must be substantially opaque to the detector sensors.

The light sources used in ATM card sensing devices are usually laser diodes. These generally have characteristic narrow output peaks lying within the 750–1200 nm wavelength range. On the other hand, the sensors in ATMs typically have broad sensitivity across the 750–1200 nm wavelength range. According to the standard known as "WP7810," in order for a financial transaction card to be able to block the sensors in a typical ATM from the laser diode light output, such that detection can occur, the card must have a minimum opacity relative to the laser diode output wavelengths of between about 1.1 and 1.3. Of course, this range may not apply to all ATMs currently in use, and it may not apply to future ATMs in the event that design changes are made. Indeed, Applicant has observed that a minimum opacity of between about 1.0–1.3 may be safely used as a lower limit in most cases.

III. EMBOSSING/ENCODING MACHINE CONSIDERATIONS

Figure 2:
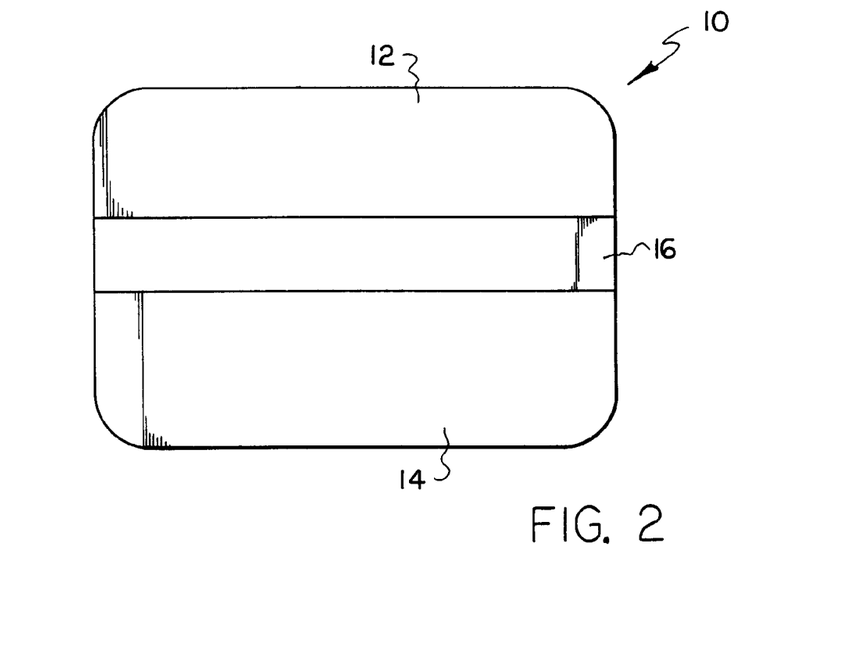
FIG. 2 is a plan view of a financial transaction card showing opacity requirements for a conventional card embossing/encoding apparatus.

Conventional financial transaction card embossing/encoding machines used during card manufacture typically employ multiple sensors to detect the presence and proper positioning of the cards. For example, the DataCard 9000 machine, manufactured by Datacard Corporation of Minnetonka, Minn., has more than fifteen sensors that check for opacity across portions of the card surface. These portions are shown in FIG. 2, which illustrates a card 10 having opaque areas conforming to the requirements of the DataCard 9000 machine. In order for the DataCard 9000 machine to function properly, a first band 12 is required to be opaque and have a band height of at least 0.826 inches, and a second band 14 required to be opaque and have a band height of at least 1.000 inches. The remaining band 16, having a nominal band height of 0.389 inches, has no requirement for opacity. It will be appreciated that other embossing/encoding equipment may have different opacity requirements.

In the DataCard 9000 machine, the card sensors detect in the near Infrared (IR) spectral region, and specifically in a wavelength range of 830–1100 nm. According to the manufacturer's specifications, to be detected by a DataCard 9000 machine, bands 12 and 14 of the card 10 must have a minimal measured opacity of 1.0 in this spectral region. However, Applicant has found that opacities as low as 0.42 at 1100 nm and 0.52 at 900 nm will result in card detection by the DataCard 9000 machine. According to Table 1 above, this corresponds to a maximum transmittance of 30% at 900 nm and 38% at 1100 nm.

IV. PREFERRED TECHNICAL SOLUTION PROVIDED BY THE INVENTION

Figure 3:
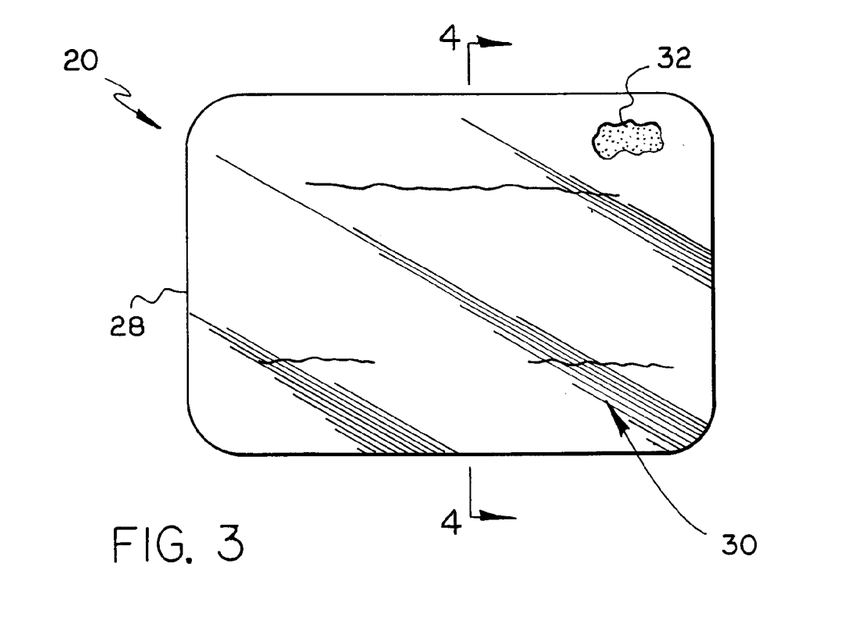
FIG. 3 is a plan view of a financial transaction card constructed in accordance with a preferred embodiment of the present invention.

Turning now to FIGS. 3 and 4a–f, a financial transaction card 20 constructed in accordance with a preferred embodiment of the present invention includes a substantially planar material sheet 22 made from polyvinyl sheet stock or other suitable material. The material sheet 22 has upper and lower surfaces 24 and 26, respectively, and a continuous peripheral edge 28. The material sheet 22 is provided with one or more areas that are at least minimally transparent or translucent relative to human-visible light. In FIG. 3, reference number 30 identifies one such area extending over the entire surface of the material sheet 22. To achieve this configuration, the material sheet 22 is preferably made entirely from transparent or translucent (polyvinyl, acrylic, polyester, etc.) sheet stock. To render the area 30 opaque to automated card processing equipment sensors, a filter, partially illustrated by reference numeral 32, is provided. As shown in FIGS. 4a–f, the filter 32 can be located at the upper surface 24 of the material sheet 22, or at any location below the upper surface. For example, although not shown, the filter 32 could also be located at or near the lower surface 26 of the material sheet 22.

The filter 32 is designed to provide opacity relative to wavelengths that are within the active wavelength range of the source/detector pairs used in card processing equipment, such as ATMs, embossing/encoding machines, and other devices. Considering sections II and III above, the worst-case scenario may be provided by ATMs, which have source/detector pairs placed across the entire card surface, and which appear to require a minimum opacity of between about 1.0–1.3 over at least a portion of the 750–1200 nm wavelength range, i.e., at the wavelengths output by the ATM laser diodes. Thus, to ensure card detection in the widest array of card processing equipment, the filter 32 may be designed to provide an opacity of at least about 1.0–1.3 within the ATM wavelength range of 750–1200 nm, and should cover all of the transparent or translucent areas of the card. This goal can be satisfied relative to card 20 by extending the filter 32 over the entirety of the transparent or translucent area 30 of the material sheet 22, i.e., over the entire card 20, and providing an opacity of at least about 1.0–1.3 over the entire 750–1200 nm ATM wavelength range. Alternatively, as discussed relative to FIGS. 5–7 below, the filter 32 could be tailored to provide the required opacity at the specific wavelength peaks output by ATM laser diodes.

The filter 32 can be made in a variety of ways. For example, it can be made from a light filtering material that is either light absorbing, light reflecting, light deflecting, light scattering or the like, relative to the applicable wavelength range. The filter 32 can also be made from various combinations of such materials. Light absorbing materials that can be used for the filter 32 include colorless light absorbers, light absorbing dyes, and other materials. In the event that dyes are used, a suitable colorant may be added to the card as necessary to provide an aesthetically pleasing card color or tint. Suitable colorants include dye colorants, light scattering materials, and fluorescent materials. Light reflecting materials that can be used for the filter 32 include silver compositions, silver-titanium oxide compositions, and other materials. Light deflecting materials that can be used for the filter 32 include light deflecting films. Light scattering materials that can be used for the filter 32 include light scattering coatings.

Figure 4A:
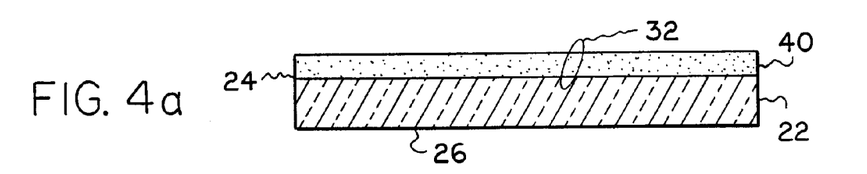
FIGS. 4a, 4b, 4c, 4d, 4e and 4f are cross-sectional views taken along line 4—4 in FIG. 3 having exaggerated thickness to show the construction of a filter in accordance with various fabrication techniques.

In specific constructions, the filter 32 can be fabricated and applied to the material sheet 22 in a variety of ways. In FIG. 4a, a suitable light filtering material, such as a near infrared light absorbent dye powder, is added to a liquid carrier, such as a solvent-based liquid vinyl coating (i.e., vinyl resin dissolved in solvent), at a filter-to-carrier weight ratio of between about 0.2%–5%, and more preferably between about 0.5%–3.5%, and most preferably between about 1.0%–2.5%. If desired, an appropriate thinner can be used to pre-dissolve the dye prior to adding it to the carrier. The filter/carrier mixture can be applied as a coating 40 to the material sheet 22 (e.g., made from poly-vinyl sheet stock), using screen printing at a mesh size ranging from about 90–390 mesh. Other application methods can also be used, including roll coating, flexography, wire-wound rod application, and others. One or more layers (e.g. 2–4 layers) of the filter/carrier mixture can be applied to the material sheet 22 as necessary to obtain the needed opacity.

One or more colorants may be used in the foregoing application to adjust the color of the resultant card, as can fluorescent materials and light scattering materials. The fluorescent and light scattering materials have the additional benefit of acting as light blocking enhancers. Dye colorants can be added to the filter/carrier mixture prior to its application to the material sheet 22. Fluorescent materials can be added in the same way. Light scattering materials can be added by mixing them in the same carrier used for the filtering material and applying the mixture as a separate coating to the material sheet 22, e.g., on the side that is opposite the filter/carrier mixture coating.

If a light absorbent dye is used, the issue of ultraviolet (uv) light and/or heat instability may be presented. Some solvent-soluble dyes will degrade in the presence of free radicals that can be generated when the financial transaction card is exposed to sunlight or to heat during lamination processing at high temperatures. As described in more detail below, these concerns can be addressed by lowering lamination processing temperatures from the usual processing range of about 270–300 degrees F to about 230–270 degrees F. Additionally a stable dye, or a mixture of a stable dye and a less stable dye combined at a suitable weight ratio (e.g., about 1:10 to 1:5) of stable dye to less stable dye, may be used. An antioxidant stabilizer may also be added to function as a free radical absorber. It can be added to the filter/carrier mixture prior to application to the material sheet 22. More preferably, however, it is applied as a separate cover layer over the filter/carrier mixture after the latter has been applied to the material sheet 22.

Figure 4B:
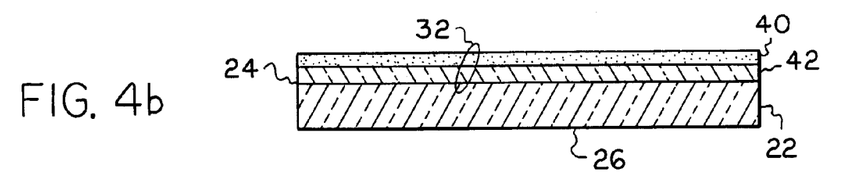

In FIG. 4b, a suitable light filtering material is added to a liquid carrier and applied as a coating 40 (see description relative to FIG. 4a) on a film 42 (e.g., made from the same material as the material sheet 22) using screen printing or other methods. The film 42 is then itself secured to the material sheet using lamination techniques, adhesive bonding, or other application methods.

Figure 4C:
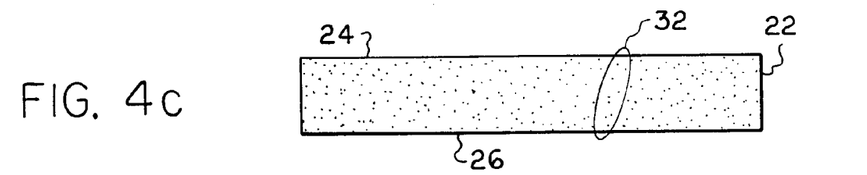

In FIG. 4c, a suitable light filtering material is incorporated into the material sheet 22 prior to or during calendaring or extrusion thereof (when it is a soft resin), or is sublimated therein by heat diffusion processing, such that the light filtering material is disbursed through all or a portion of the material sheet.

Figure 4D:
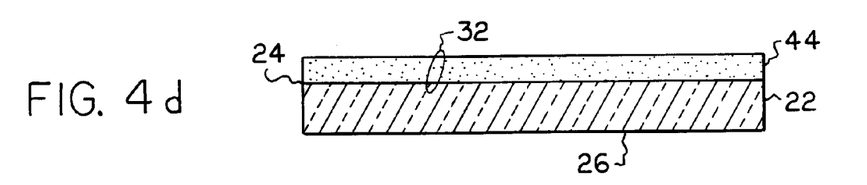

In FIG. 4d, a suitable light filtering material is incorporated in a film 44 during calendaring or extrusion thereof (when it is a soft resin), or is sublimated therein by heat diffision processing. The film 44 is then itself secured to the material sheet 22 using lamination techniques, adhesive bonding, or other application methods.

Figure 4E:
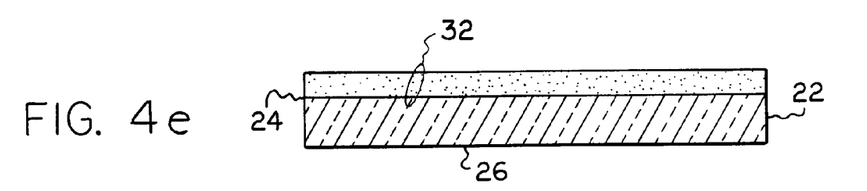

In FIG. 4e, a suitable light filtering material, such as a silver-titanium oxide coating material, is deposited on the material sheet 22 using a suitable deposition technique (e.g., vacuum deposition). Multiple layers (e.g., 2–4) may be applied as necessary to obtain the required opacity.

Figure 4F:
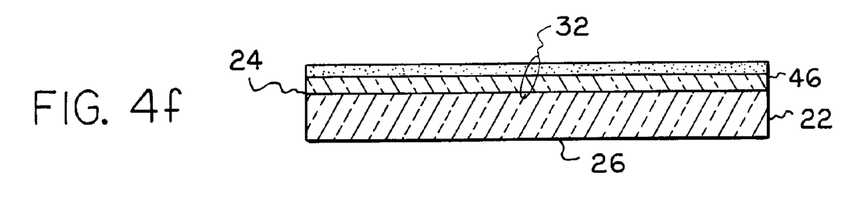

In FIG. 4f, a suitable light filtering material is deposited on a film 46 using a suitable deposition technique and the film is then itself secured to the material sheet 22 using lamination techniques, adhesive bonding, or other application methods.

Still other filter constructions will no doubt also be apparent to persons skilled in the art in view of the teachings herein. Specific construction examples follow:

EXAMPLE 1

In this example, 22 grams of a first near infrared powdered absorption dye, sold under the name ADS1065A by American Dye Source, Inc. of Mount Royal, Quebec, Canada, and 3 grams of a second (more light and heat stable) near infrared powdered absorption dye, sold under the name ADS870MC by American Dye Source, Inc. (both dyes being organic solvent-soluble), were pre-dissolved in 110 grams of an organic solvent-based thinner sold under the name Nazdar VF 190 by Nazdar Co., Inc. of Chicago, Ill. This mixture was combined with 990 grams of a clear vinyl resin-based solvent coating material, sold by Nazdar Co., Inc. under the name Nazdar 132688AB. The Nazdar 132688AB organic solvent material is understood to include the following components (with all percentages being by weight):

| Component | Percentage |
| --- | --- |
| Vinyl resins | 20–25% |
| Petroleum Distillates (Aromatic) | 35–40% |
| Cyclohexanone | 5–10% |
| Diacetone Alcohol | 5–10% |
| Gamma Butyrolactone | 5–10% |
| Napthalene | less than 5% |
| Petroleum Distillates (Aliphatic) | 2% |

The Nazdar VF 190 thinner is understood to have the same solvent component ratios but does not have the vinyl resins.

Because the resultant solution had a yellow tint, two organic, solvent-soluble colorants were used to add violet color to the solution to yield a neutral grey tint in the cards produced. These colorants are sold by CIBA Specialty Chemicals of Tarrytown, N.Y., under the names Orasol Red BL 125414AA and Orasol Blue GN 0180146AA. The amount of colorant added was 0.25 grams of the red colorant and 0.35 grams of the blue colorant. The foregoing filtering mixture was stirred at room temperature for approximately 15 minutes and then coated onto a transparent 15 mil calendared vinyl film with screen printing using a 195 mesh screen. In the card samples produced, 2, 3 and 4 layers of the filtering mixture were respectively used in making three different groups of the samples. The coated film was then compression laminated onto a transparent 15 mil polyvinyl base sheet (30 mil total thickness).

Figure 5:
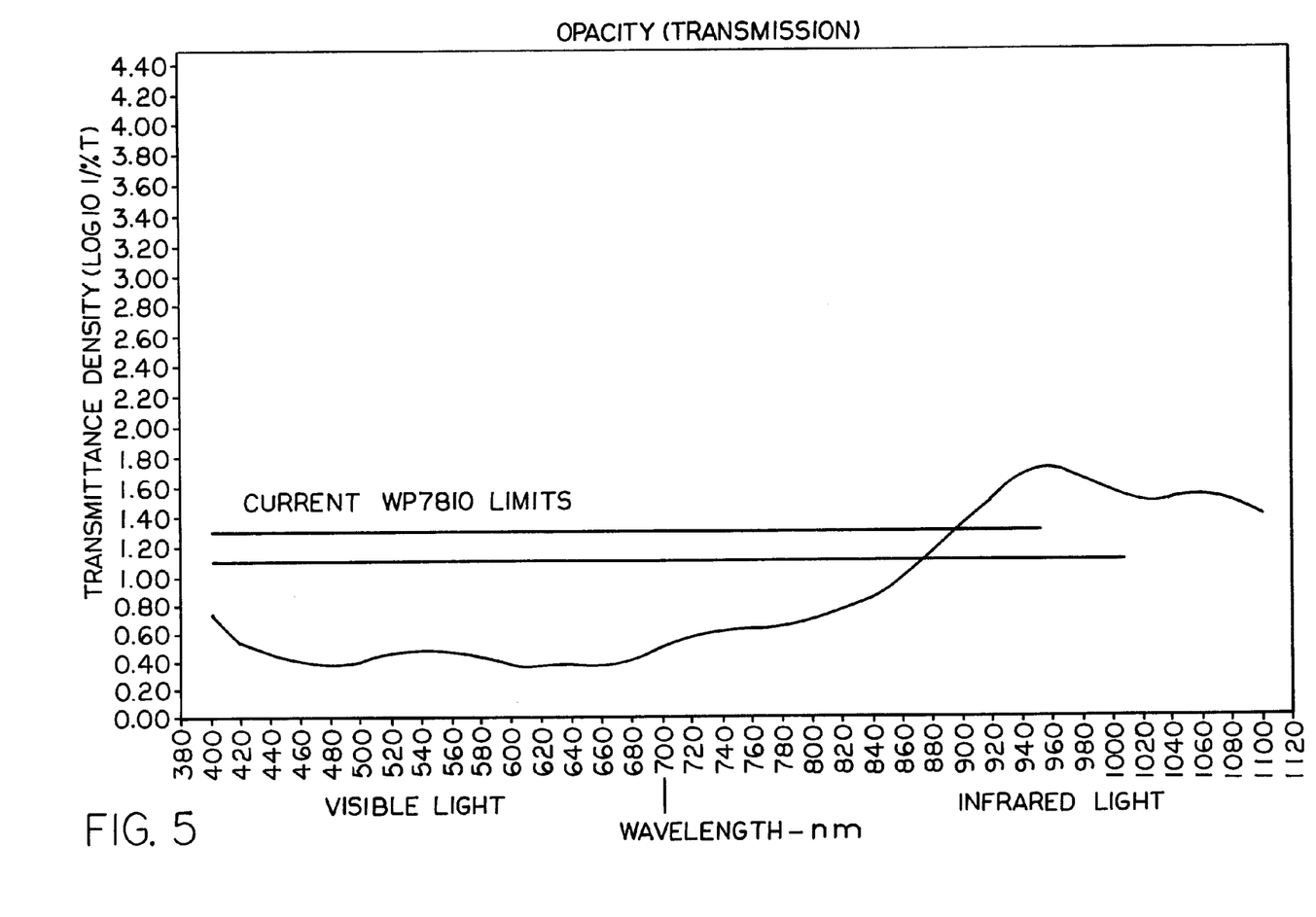
FIG. 5 is a graph showing opacity versus wavelength for a tested card having two filtering layers.
Figure 6:
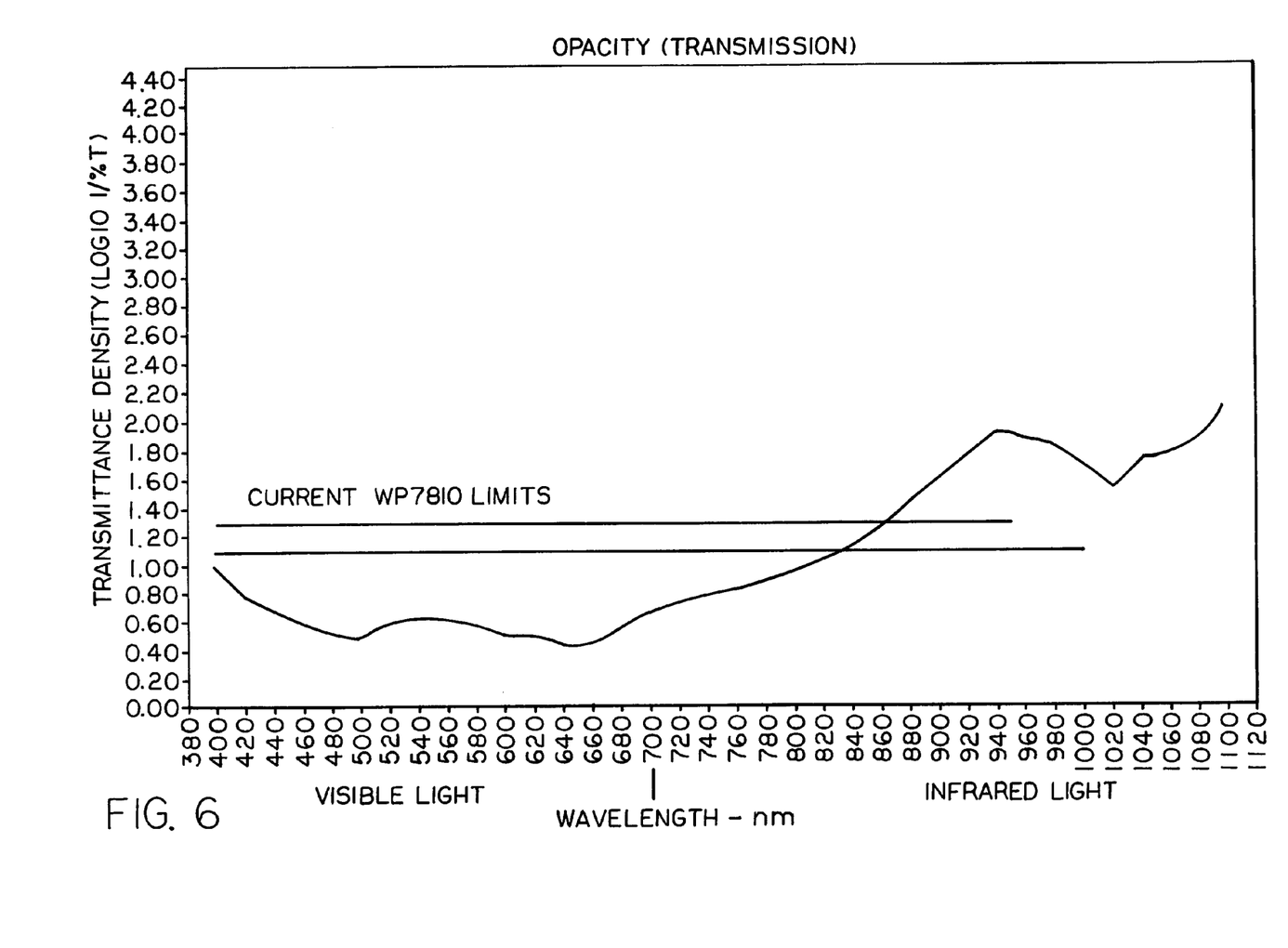
FIG. 6 is a graph showing opacity versus wavelength for a tested card having three filtering layers.
Figure 7:
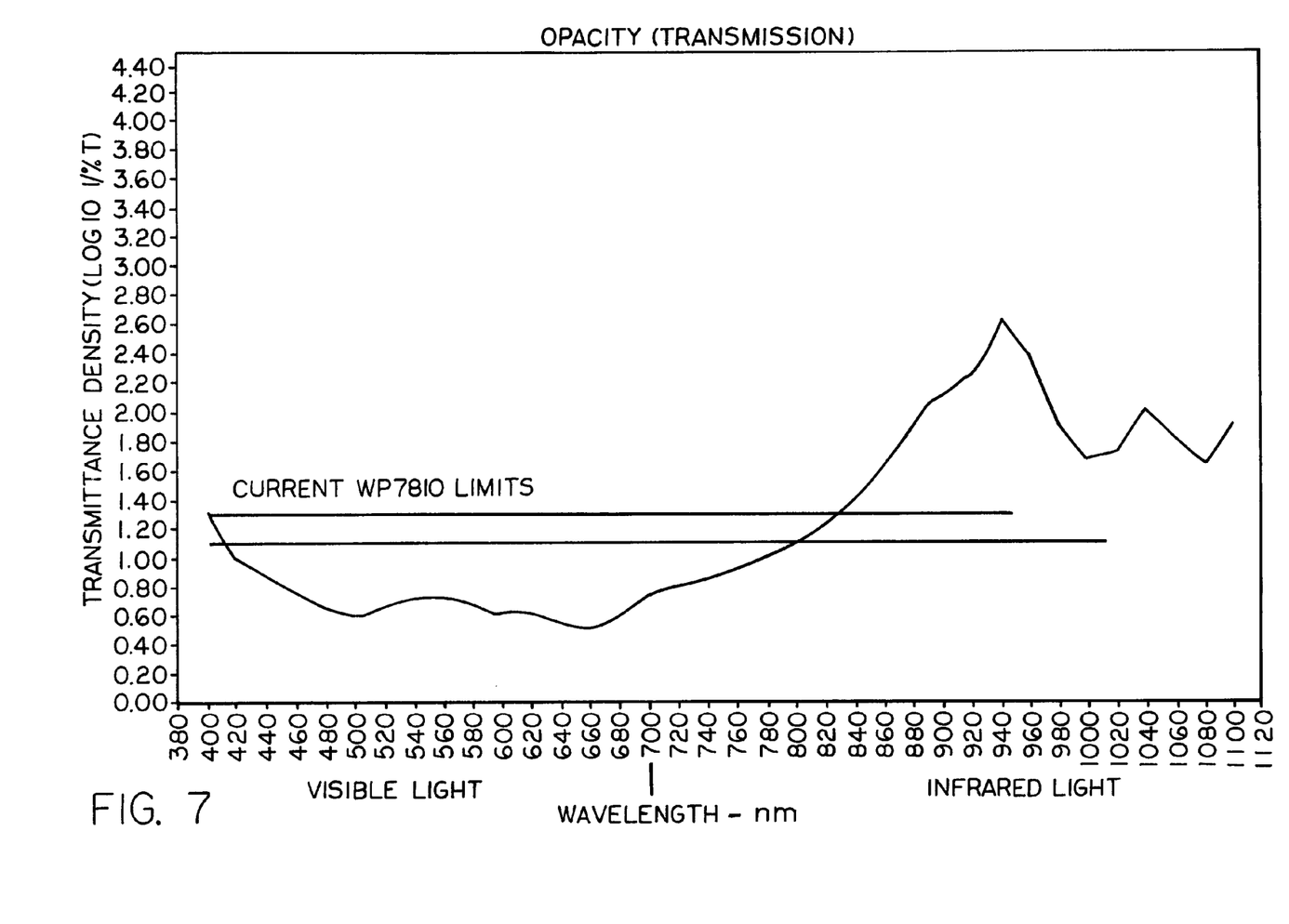
FIG. 7 is a graph showing opacity versus wavelength for a tested card having four filtering layers.

Cards constructed according to the foregoing example were tested and found to be detectable by an ATM machine. In addition, the cards were subjected to spectrographic analysis. FIGS. 5, 6 and 7 illustrate the results that analysis. FIG. 5 shows test results for a 2-layer card, FIG. 6 shows test results for a 3-layer card, and FIG. 7 shows test results for a 4-layer card. In each figure, opacity is plotted against wavelength, and the current WP7810 minimum opacity range limits of 1.1 and 1.3 are also highlighted.

As shown in FIG. 5, with 2 filtering mixture layers, the opacity is about 0.4 in the visible light range at 550 nm (40% transrnittance). In the near infrared light range, the opacity begins at approximately 0.6 at the 750 nm wavelength threshold and climbs until it reaches an opacity of approximately 1.1–1.3 at wavelengths of approximately 880–895 nm. The opacity then continues to increase until it peaks at approximately 960 nm, and then begins to gradually taper off, although never dropping below an opacity of 1.3 through at least a wavelength of about 1100 nm.

As shown in FIG. 6, with 3 filtering mixture layers, the opacity is about 0.6 in the visible light range at 550 nm (25% transmittance). In the near infrared light range, the opacity begins at approximately 0.75 at the 750 nm wavelength threshold and climbs until it reaches an opacity of approximately 1.1–1.3 at wavelengths of approximately 820–860 nm. The opacity then continues to increase until it peaks at an opacity of approximately 1.95 at a wavelength of approximately 940 nm. The opacity then tapers off to a level of approximately 1.5 at approximately 1020 nm, and then begins increasing again such the opacity remains above 1.3 through at least a wavelength of about 1100 nm.

As shown in FIG. 7, with 4 filtering mixture layers, the opacity is about 0.7 in the visible light range at 550 nm (20% transmittance). In the near infrared light range, the opacity begins at approximately 0.90 at the 750 nm wavelength threshold and climbs until it reaches an opacity of approximately 1.1–1.3 at wavelengths of approximately 805–830 nm. The opacity then continues to increase until it peaks at an opacity of approximately 2.6 at a wavelength of approximately 940 nm. The opacity then tapers off to a level of approximately 1.65 at approximately 1000 nm, and then reaches another opacity peak of approximately 2.0 at approximately 1040 nm. Tapering again occurs to an opacity of approximately 1.6 at approximately 1080 nm, whereupon the opacity again begins to increase such the opacity remains above 1.3 through at least a wavelength of about 1100 mn.

The foregoing data suggest two scenarios. First, some ATMs, including the one used to test the cards in this example, may not actually require an opacity of 1.1–1.3 (or even the broader range of 1.0–1.3 described above) to properly detect a financial transaction card. Second, and probably more likely, the narrowband light sources used in ATMs, including the one used to test the cards, probably emit light at wavelengths that are above the point where each card reaches the 1.1–1.3 WP7810 opacity specification.

Persons skilled in the art will appreciate from the foregoing that cards constructed in accordance with the present invention should either have sufficient opacity (e.g., 1.0–1.3) over the widest possible wavelength range used by ATM light sources, or should have sufficient opacity at wavelength peaks that are specific to those light sources, as may be determined from investigation of existing and future ATM machines. For maximum flexibility of use and ease of manufacturing, the former solution is preferred.

EXAMPLE 2

In this example, 13.00 grams of a near infrared powdered absorption dye, sold under the name Epolight III-357 by Epolin of Newark, N.J., and 4.33 grams of a UV absorber sold, under the name Cyasorb UV 5411 from Cytec Industries, Inc. of West Paterson N.J., were pre-dissolved in 130.00 grams of the Nazdar VF 190 thinner. The Epolight-357 dye is an organic solvent-soluble material having good visible light transmittance, good heat stability and maximum light absorbance at a wavelength of about 950 nm. The foregoing mixture was combined with 633.00 grams of the Nazdar 132688AB material. To adjust the resultant color, two fluorescent colorants were added. These colorants are sold by DAY-GLO Color Corp. of Cleveland, Ohio under the names DayGlo Blue VC19 and DayGlo Red VC11. The amount of each of these colorants was 21.66 grams. The foregoing filtering mixture was stirred at room temperature for approximately 15 minutes and then coated onto a transparent 15 mil calendared vinyl film with screen printing using a 195 mesh screen. The opacity in the visible light range at 550 nm was about 0.22 (60% transmittance) for this card. In the near infrared light range at 950 nm, the opacity was slightly greater than about 1.0.

EXAMPLE 3

In this example, 15.00 grams of a near infrared powdered absorption dye, sold under the name Epolight III-57 by Epolin of Newark, N.J., and 4.5 grams of the Cyasorb UV5411 UV absorber were mixed with 980.5 grams of the Nazdar 132688AB material. The Epolight-57 dye is an organic solvent-soluble material having good visible light transmittance, good heat stability and maximum light absorbance at a wavelength of about 990 nm. The foregoing filtering mixture was stirred at room temperature for approximately 15 minutes and then coated onto a transparent 15 mil calendared vinyl film with screen printing using a 195 mesh screen. The opacity in the visible light range at 550 nm was about 0.15 (75.2% transmittance) for this card. In the near infrared light range at 950 nm, the opacity was about 1.2.

EXAMPLE 4

In this example, 13.00 grams of the Epolight III-57 dye and 4.33 grams of the Cyasorb UV 5411 UV absorber were pre-dissolved in 130.00 grams of the Nazdar VF 190 thinner. This mixture was combined with 633.00 grams of the Nazdar 132688AB material. To adjust the resultant color, the fluorescent colorants of Example 2 were added to the coating. The amount of fluorescent material added was 65.00 grams of the DayGlo Blue VC19 material and 21.66 grams of the DayGlo Red VC11 material. The foregoing filtering mixture was stirred at room temperature for approximately 15 minutes and then coated onto a transparent 15 mil calendared vinyl film with screen printing using a 195 mesh screen.

In addition to the foregoing, the vinyl film to which the filtering mixture was applied was also coated (on the opposite side from the filtering mixture) with a mixture containing 907.50 grams of the Nasdar 13288AB material, 90.00 grams of a light scattering material sold under the name Silver Pox Fine Pearl by FM Group Inc. of Sloatsburg, N.Y., and 2.50 grams of a fluorescent whitening agent sold under the name Uvitex OB by CIBA Specialty Chemicals of Tarrytown N.Y. This mixture was coated on the vinyl film using 195 mesh screen, prior to applying the filtering mixture. The opacity in the visible light range was about 0.79 (16.8% transmittance) for this card. In the near infrared light range at 950 nm, the opacity was about 1.45.

Relative to this Example 4 and to Example 2 above, it has been found that the addition of fluorescent materials to the filtering mixture coating, or when applied as a separate coating, is beneficial to the resultant card's near infrared light absorbing ability. The Uvitex OB is a compound in this category. Added amounts of 0.25% to 2.5% (by weight) of this compound have been found to drop light transmission readings in the near infrared region by as much as 15%. This occurs only if the light filtering material (e.g., the near infrared absorber) is present. The compound does not itself appear to have any substantial absorption in the near infrared region.

Additionally, it has been found that the use of transparent fluorescent pigments, such as the DayGlo materials described above, can neutralize the yellow-green color of the near infrared absorbing material with less darkening than can standard pigments and dyes.

Fluorescent materials have the property of absorbing light in one region of the spectrum and re-emitting light in the visible region (400–700 nm). This has the effect of brightening the appearance of materials to which they are added.

Applicant has also discovered that the addition of light scattering mechanisms to the card can work in conjunction with the light filtering material. For example, the above-described Silver Pox Fine Pearl translucent material is a light scatterer. It appears that unidirectional light from a near infrared light source is scattered in all directions so as to reduce the amount of light seen by an opposing sensor. The same amount of light is being transmitted through the card (at any wavelength), but only a small amount is seen as unidirectional light by the sensor. Test data indicates that the amount of light seen by the sensor can be reduced by as much as about 50% by the addition of light scattering mechanisms.

Another light scattering mechanism is to manufacture the card with a flat (as opposed to gloss) surface. The application of this type of surface to one or both sides of the card will reduce light seen by the sensor by up to about 50%.

A preferred light scattering material was found to be retro-reflective beads (glass spheres) such as T4 beads from Potters Industries Inc. of Valley Forge, Pa. Prototype samples were made by applying the beads evenly across a wet coating on the vinyl and then drying the coating. The vinyl sheet was laminated as a card. Spectrophotometer readings across the spectrum were in the 15–20% transmittance range as only this portion of all wavelengths was being allowed to transmit through the material unidirectionally. Of significance is the fact that the index of refraction of the glass sphere beads is 1.90 as compared to 1.50 for the vinyl sheeting.

It is noteworthy that reduction of measured transmittance by a spectrophotometer or reduction of light seen by a sensor in a card reading device through light scattering mechanisms works across the entire light spectrum. The visible spectrum is affected as much as the near infrared region. Thus, the overuse of light scatterers will work against the requirement for a card that is transparent with respect to human-visible light.

EXAMPLE 5

A silver-titanium oxide coating, sold under the registered trademark SOL-MOX by Innovative Specialty Films LLC, of San Diego, Calif., was applied to the surface of a transparent 3 mil polyester film using vacuum deposition processing. In the card samples produced, four such film layers were formed and compression laminated onto a transparent polyvinyl base sheet (30 mil total thickness). Note that the cards produced in accordance with this example were somewhat opaque in the visible light range and this production method is therefore not as preferred as the production method of Example 1.

Accordingly, a financial transaction card that is transparent or translucent to human viewing yet detectable by automated card processing equipment has been disclosed. While various embodiments have been shown and described, it should be apparent that many variations and alternative embodiments would be apparent to those skilled in the art in view of the teachings herein. For example, although specific automated card processing equipment with characteristic source/detector wavelength and opacity requirements are described, it will be appreciated that the concepts of the present invention can be applied to financial transaction cards used in other equipment having different wavelength and opacity requirements. In addition, although specific filter constructions are described it will be appreciated that many other filter designs may be utilized to achieve successful implementation of the invention. It will be understood, therefore, that the invention is not to be in any way limited except in accordance with the spirit of the appended claims and their equivalents.

What is claimed is:

1. A financial transaction card that is transparent or translucent to human viewing yet detectable by automated card processing equipment having near Infrared source/detector pairs each having a source and a detector respectively positioned to face opposing sides of said card when said card is positioned in said equipment for detection and to detect said card by sensing an interruption of near Infrared light transmitted from said source to said detector due to the presence of said card, comprising:
   a substantially planar material sheet having upper and lower surfaces bounded by a continuous peripheral edge;
   said material sheet being transparent or translucent with respect to human visible light; and
   a near Infrared light filter covering one of said upper or lower surfaces of said material sheet, said filter comprising a screen-printed coating of a light filtering powder dissolved in a clear liquid carrier at a powder-to-carrier ratio of about 0.2–5% by weight;
   said filter producing sufficient card opacity relative to one or more near Infrared light wavelengths to render said card detectable by said source/detector pairs by blocking near Infrared light emitted by said source from reaching said detector, thereby triggering detection of said card, while still allowing said card to transmit human visible light.

2. A financial transaction card in accordance with claim 1 wherein said automated card processing equipment includes card embossing/encoding machines having source/detector pairs operating in a light wavelength range of about 830–1100 nm, and wherein said filter has an opacity relative to one or more wavelengths within said range of not substantially less than about 0.42.

3. A financial transaction card in accordance with claim 1 wherein said automated card processing equipment includes automated teller machines having source/detector pairs operating in a light wavelength range of about 750–1200 nm, and wherein said filter has an opacity of not substantially less than about 1.0–1.3 relative to one or more wavelengths within the portion of said wavelength range corresponding to about 830–1100 nm.

4. A financial transaction card in accordance with claim 1 wherein said automated card processing equipment includes card embossing/encoding machines having source/detector pairs operating in a light wavelength range of about 830–1100 nm, and automated teller machines having source/detector pairs operating in a light wavelength range of about 750–1200 nm, and wherein said filter has an opacity of not less than about 1.0–1.3 relative to one or more wave lengths within said wavelength range of between about 830–1100 nm.

5. A financial transaction card in accordance with claim 1 wherein said filter is a light absorbing material, a light reflecting material, a light deflecting material, or a combination of two or more such materials.

6. A financial transaction card in accordance with claim 1 wherein said filter is formed from a light absorbing dye.

7. A financial transaction card in accordance with claim 1 wherein said filter is formed from a light reflecting material.

8. A financial transaction card in accordance with claim 1 wherein said filter is formed from a light scattering material.

9. A method for manufacturing a financial transaction card that is transparent or translucent to human viewing yet detectable by automated card processing equipment having near Infrared source/detector pairs each having a source and a detector respectively positioned to face opposing sides of said card when said card is positioned in said equipment for detection and to detect said card by sensing an interruption of near Infrared light transmitted by said source to said detector due to the presence of said card, comprising:
   selecting a substantially planar material sheet having upper and lower surfaces bounded by a continuous peripheral edge;
   said material sheet being transparent or translucent with respect to human visible light;
   applying a near Infrared filter to cover one of said upper or lower surfaces of said material sheet, as follows:
      dissolving a light filtering powder in a clear liquid carrier at a powder-to-carrier ratio of about 0.2–5% by weight to form a coating;
      screen printing said coating onto said material sheet; and
      allowing said coating to dry on said material sheet to harden said filter;

said filter producing sufficient card opacity relative to one or more near Infrared light wavelengths to render said card detectable by said source/detector pairs by blocking near Infrared light emitted by said source from reaching said detector, thereby triggering detection of said card, while still allowing said card to transmit human visible light at a transmittance level of at least about 15%.

10. A method in accordance with claim 9 wherein said automated card processing equipment includes card embossing/encoding machines having source/detector pairs operating in a light wavelength range of about 830–1100 nm, and wherein said filter is constructed to have an opacity relative to one or more wavelengths within said range of not substantially less than about 0.42.

11. A method in accordance with claim 9 wherein said automated card processing equipment includes automated teller machines having source/detector pairs operating in a light wavelength range of about 750–1200 nm, and wherein said filter is constructed to have an opacity of not substantially less than about 1.0–1.3 relative to one or more wavelengths within the portion of said wavelength range corresponding to about 830–1100 nm.

12. A method in accordance with claim 9 wherein said automated card processing equipment includes card embossing/encoding machines having source/detector pairs operating in a light wavelength range of about 830–1100 nm, and automated teller machines having source/detector pairs operating in a light wavelength range of about 750–1200 nm, and wherein said filter is constructed to have an opacity of not less than about 1.0–1.3 relative to one or more wavelengths within said wavelength range of between about 830–1100 nm.

13. A method in accordance with claim 9 wherein said filter is a light absorbing material, a light reflecting material, a light deflecting material, or a combination of two or more such materials.

14. A method in accordance with claim 9 wherein said filter is formed from a light absorbing dye.

15. A method in accordance with claim 9 wherein said filter is formed from a light reflecting material.

16. A method in accordance with claim 9 wherein said filter is formed from a light scattering material.

17. A financial transaction card that is transparent or translucent to human viewing yet detectable by automated card processing equipment having near Infrared source/detector pairs each having a source and a detector respectively positioned to face opposing sides of said card when said card is positioned in said equipment for detection and to detect said card by sensing an interruption of near Infrared light transmitted by said source to said detector due to the presence of said card, comprising:
  a sheet of material that is transparent or translucent to human viewing and having upper and lower surfaces bounded by a continuous peripheral edge;
  a near Infrared filter applied to cover one of said upper or lower surfaces of said material sheet;
  said filter comprising a coating on said material sheet of a light absorbing dye powder dissolved in a clear plastic resin-based liquid carrier at a powder-to-carrier ratio of about 0.2–5% by weight;
  said filter providing sufficient card opacity relative to one or more near Infrared light wavelengths to render said card detectable by said source/detector pairs by blocking near Infrared light emitted by said source from reaching said detector, thereby triggering detection of said card, while still allowing said card to transmit human visible light.

18. A financial transaction card in accordance with claim 17 wherein said light absorbing dye material is dissolved in said liquid carrier at a dye-to-carrier weight ratio of between about 0.5–3.5%.

19. A financial transaction card in accordance with claim 17 wherein said light absorbing dye material is dissolved in said liquid carrier at a dye-to-carrier weight ratio of about 1.0–2.5%.

20. A financial transaction card in accordance with claim 17 wherein said liquid carrier comprises a plastic resin-based coating material.

21. A financial transaction card in accordance with claim 17 wherein said filter comprises a screen-printed coating of between about 90–390 mesh.

22. A financial transaction card in accordance with claim 17 wherein said filter comprises a screen printed coating of about 195 mesh.

23. A financial transaction card in accordance with claim 17 wherein said liquid carrier is an organic solvent-based liquid vinyl carrier.

24. A financial transaction card in accordance with claim 17 wherein a colorant is dissolved with said dye material in said liquid carrier to provide a desired color or tint.

25. A financial transaction card in accordance with claim 24 wherein said dye is a powdered dye material that produces a yellow tint and wherein said colorant is a violet colorant material that combines with said yellow tint of said dye material to provide a neutral grey tint in said card.

26. A financial transaction card in accordance with claim 24 wherein said colorant is a dye colorant.

27. A financial transaction card in accordance with claim 24 wherein said colorant is a fluorescent material.

28. A financial transaction card in accordance with claim 17 wherein said filter coating comprises between about 2–4 layers of said dye material and said liquid carrier.

29. A financial transaction card in accordance with claim 28 wherein said card has an opacity of at least approximately 1.0–1.3 relative to selected light wavelength peaks corresponding to the output of light sources used in said sensor/detector pairs.

30. A financial transaction card in accordance with claim 17 wherein said card has an opacity of at least approximately 1.0–1.3 relative to one or more light wavelengths of approximately 830 nm and higher.

31. A financial transaction card in accordance with claim 17 wherein said filter includes a fluorescent material dissolved in said liquid coating.

32. A financial transaction card in accordance with claim 17 wherein said card includes a light scattering coating applied to cover one of said upper or lower surfaces of said material sheet.

33. A financial transaction card in accordance with claim 17 wherein said filter includes an Ultraviolet light absorber dissolved in said liquid coating.

34. A financial transaction card in accordance with claim 17 wherein said filter is made from an organic solvent-soluble, near Infrared absorption dye and an Ultraviolet light absorbing material dissolved in said liquid carrier.

35. A financial transaction card in accordance with claim 17 wherein said filter is made from an organic solvent-soluble, near Infrared powdered absorption dye, an Ultraviolet light absorbing material, and one or more colorants dissolved in said liquid carrier.

36. A financial transaction card in accordance with claim 17 wherein said filter is made from an organic solvent-soluble, near Infrared absorption dye, an Ultraviolet light absorbing material, and one or more fluorescent materials dissolved in said liquid carrier.

37. A financial transaction card that is transparent or translucent to human viewing yet detectable by automated card processing equipment having near Infrared source/detector pairs, comprising:
- a sheet of material that is transparent or translucent to human viewing and having upper and lower surfaces bounded by a continuous peripheral edge;
- a near Infrared filter applied to cover one of said upper or lower surfaces of said material sheet;
- said filter comprising a coating on said material sheet of a light absorbing dye powder dissolved in a clear plastic resin-based liquid carrier at a powder-to-carrier ratio of about 0.2–5% by weight;
- whereby said filter provides sufficient card opacity relative to one or more near Infrared light wavelengths to render said card detectable by said source/detector pairs, while still allowing said card to transmit human visible light; and
- wherein said filter is made from a first organic solvent-soluble, near Infrared powdered absorption dye and a second organic solvent-soluble, near Infrared powdered absorption dye, said second dye having more ultraviolet light and/or heat stability than said first dye, said first and second dye materials being dissolved in said liquid carrier.

38. A financial transaction card that is transparent or translucent to human viewing yet detectable by automated card processing equipment having near Infrared source/detector pairs, comprising:
- a sheet of material that is transparent or translucent to human viewing and having upper and lower surfaces bounded by a continuous peripheral edge;
- a near Infrared filter applied to cover one of said upper or lower surfaces of said material sheet;
- said filter comprising a coating on said material sheet of a light absorbing dye powder dissolved in a clear plastic resin-based liquid carrier at a powder-to-carrier ratio of about 0.2–5% by weight;
- whereby said filter provides sufficient card opacity relative to one or more near Infrared light wavelengths to render said card detectable by said source/detector pairs, while still allowing said card to transmit human visible light; and
- wherein said liquid carrier is a vinyl resin-based coating material that includes (by weight) about 20–25% vinyl resins, about 35–40% aromatic petroleum distillates, about 5–10% cyclohexanone, about 5–10% diacetone alcohol, about 5–10% gamma butyrolactone, less than about 5% naphthalene, and about 2% aliphatic petroleum distillates.

39. A financial transaction card in accordance with claim 38 wherein said filter is made from one or more layers comprising a mixture of a first organic solvent-soluble, near Infrared powdered absorption dye, a second organic solvent-soluble, near Infrared powdered absorption dye, said second dye having more Ultraviolet light and/or heat stability than said first dye, an organic solvent-soluble red colorant, an organic solvent-soluble blue colorant, a thinner, and said vinyl resin-based coating material, said thinner comprising all of the components of aid coating material at the same ratios, with the exception of said vinyl resins which are not present in said thinner.

40. A financial transaction card in accordance with claim 39 wherein the respective proportions of said first dye, said second dye, said red colorant, said blue colorant, said thinner, and said vinyl resin-based coating material in said mixture are about 22:3:0.25:0.35:110:990 by weight, and wherein two filter layers of said mixture are used to produce a card having an opacity of approximately 0.4 at a wavelength of about 550 nm, approximately 1.3 at a wavelength of about 890 nm, and approximately 1.7 at a wavelength of about 950 nm.

41. A financial transaction card in accordance with claim 39 wherein the respective proportions of said first dye, said second dye, said red colorant, said blue colorant, said thinner, and said vinyl resin-based coating material in said mixture are about 22:3:0.25:0.35:110:990 by weight, and wherein three filter layers of said mixture are used to produce a card having an opacity of approximately 0.6 at a wavelength of about 550 nm, approximately 1.5 at a wavelength of about 890 nm and approximately 1.9 at a wavelength of about 950 nm.

42. A financial transaction card in accordance with claim 39 wherein the respective proportions of said first dye, said second dye, said red colorant, said blue colorant, said thinner, and said vinyl resin-based coating material in said mixture are about 22:3:0.25:0.35:110:990 by weight, and wherein four filter layers of said mixture are used to produce a card having an opacity of approximately 0.6 at a wavelength of about 550 nm, approximately 2.0 at a wavelength of about 890 mn and approximately 2.5 at a wavelength of about 950 nm.

43. A financial transaction card in accordance with claim 38 wherein said filter is made from one or more layers comprising a mixture of an organic solvent-soluble, near Infrared powdered absorption dye, an organic solvent-soluble Ultraviolet (UV) light absorber, an organic solvent-soluble fluorescent blue colorant, an organic solvent-soluble fluorescent red colorant, a thinner and said vinyl resin-based coating material, said thinner comprising all of the components of said coating material at the same ratios, with the exception of said vinyl resins which are not present in said thinner.

44. A financial transaction card in accordance with claim 43 wherein the respective proportions of said dye, said UV absorber, said blue colorant, said red colorant, said thinner, and said vinyl resin-based coating material in said mixture are about 13:4.33:21.66:21.66:130:633 by weight, and wherein one or more filter layers of said mixture are used to produce a card having an opacity of approximately 0.2 at a wavelength of about 550 nm and approximately 1.0 at a wavelength of about 950 nm.

45. A financial transaction card in accordance with claim 38 wherein said filter is made from one or more layers comprising a mixture of an organic solvent-soluble, near Infrared absorption dye, an organic solvent-soluble Ultraviolet light (UV) absorber, and said vinyl resin-based coating material.

46. A financial transaction card in accordance with claim 45 wherein the respective proportions of said dye, said UV absorber, and said vinyl resin-based coating material in said mixture are about 15:4.5:980.5 by weight, and wherein one or more filter layers of said mixture are used to produce a card having an opacity of approximately 0.2 at a wavelength of about 550 nm and approximately 1.2 at a wavelength of about 950 nm.

47. A financial transaction card in accordance with claim 45 wherein said filter is disposed on one side of said material sheet and a light scattering film is disposed on the other side of said material sheet.

48. A financial transaction card in accordance with claim 47 wherein said filter is made from one or more layers comprising a first mixture of an organic solvent-soluble, near Infrared absorption dye, an organic solvent-soluble Ultraviolet (UV) light absorber, an organic solvent-soluble fluorescent blue colorant, an organic solvent-soluble fluorescent red colorant, a thinner and said vinyl resin-based coating material, said thinner comprising all of the components of said coating material at the same ratios, with the exception of said vinyl resins which are not present in said thinner, and wherein said light scattering film is made from one or more layers comprising a second mixture of a translucent light scattering material, an organic solvent-soluble fluorescent whitening agent and said vinyl resin-based coating material.

49. A financial transaction card in accordance with claim 48 wherein the respective proportions of said dye, said UV absorber, said fluorescent blue colorant, said fluorescent red colorant, said thinner, and said vinyl resin-based coating material in said first mixture are about 13:4.33:65:21.66:130:633 by weight, wherein the respective proportions of said light scattering material, said fluorescent whitening agent and said vinyl resin-based coating material in said second mixture are about 90:2.5:907.5, wherein one or more filter layers of said first mixture and one or more light scattering film layers of said second mixture are used to produce a card having an opacity of approximately 0.8 at a wavelength of about 550 nm and approximately 1.5 at a wavelength of about 950 nm.

* * * * *